April 17, 1956 — J. W. DENNING — 2,741,874
SLATTED SHELTERS
Filed May 16, 1952 — 2 Sheets-Sheet 1
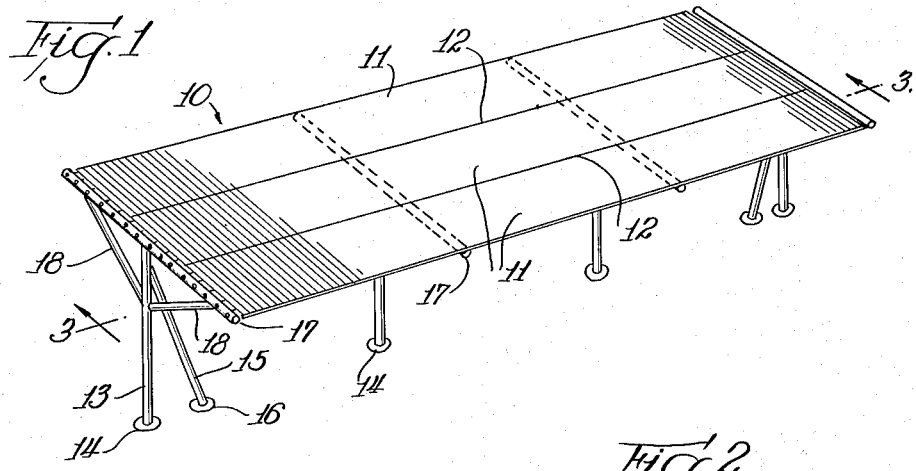
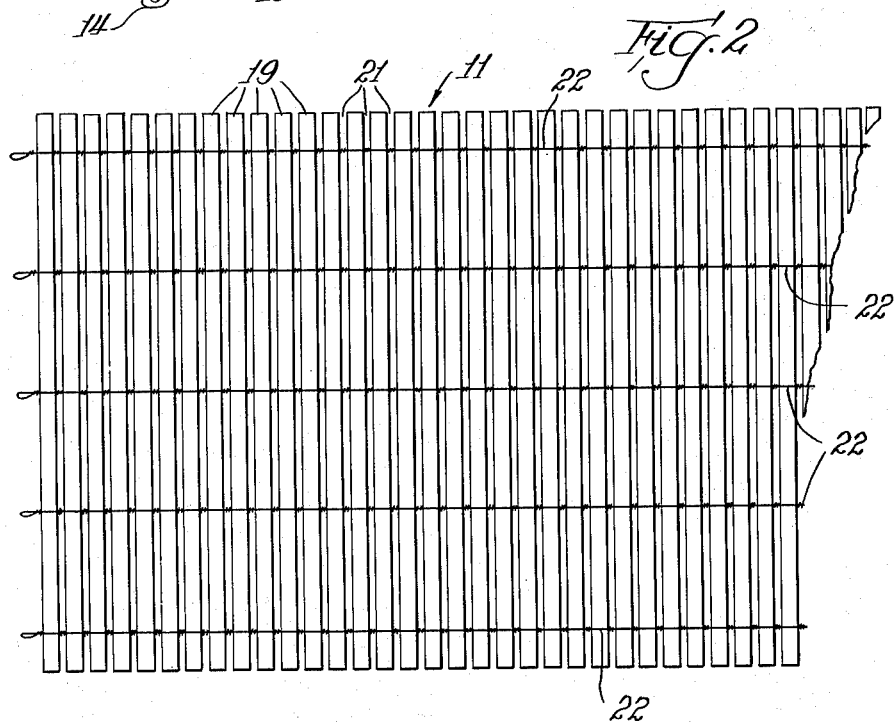
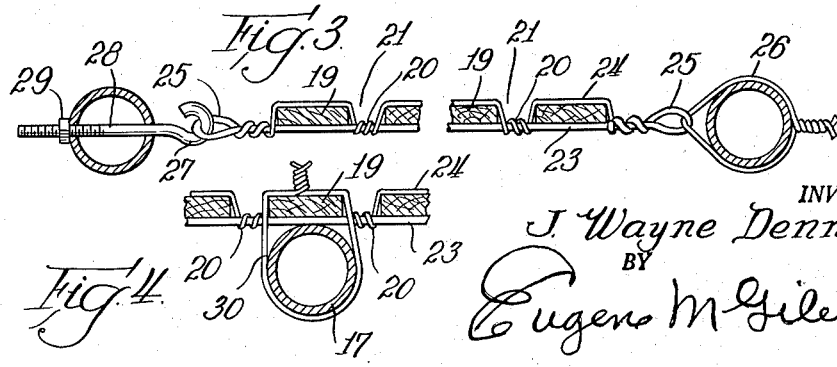
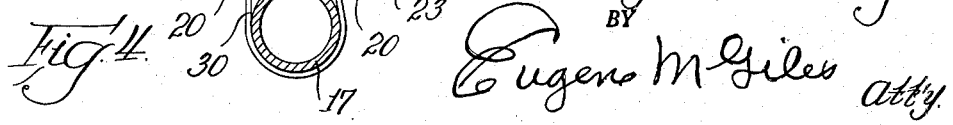
INVENTOR.
J. Wayne Denning
BY Eugene M. Giles, Atty.

April 17, 1956 J. W. DENNING 2,741,874
SLATTED SHELTERS
Filed May 16, 1952 2 Sheets-Sheet 2
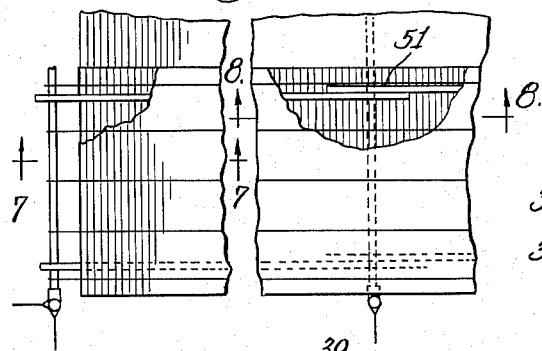
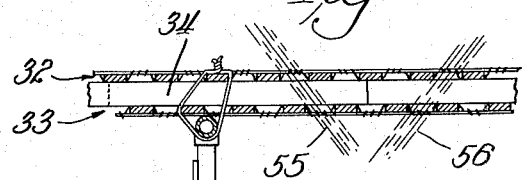
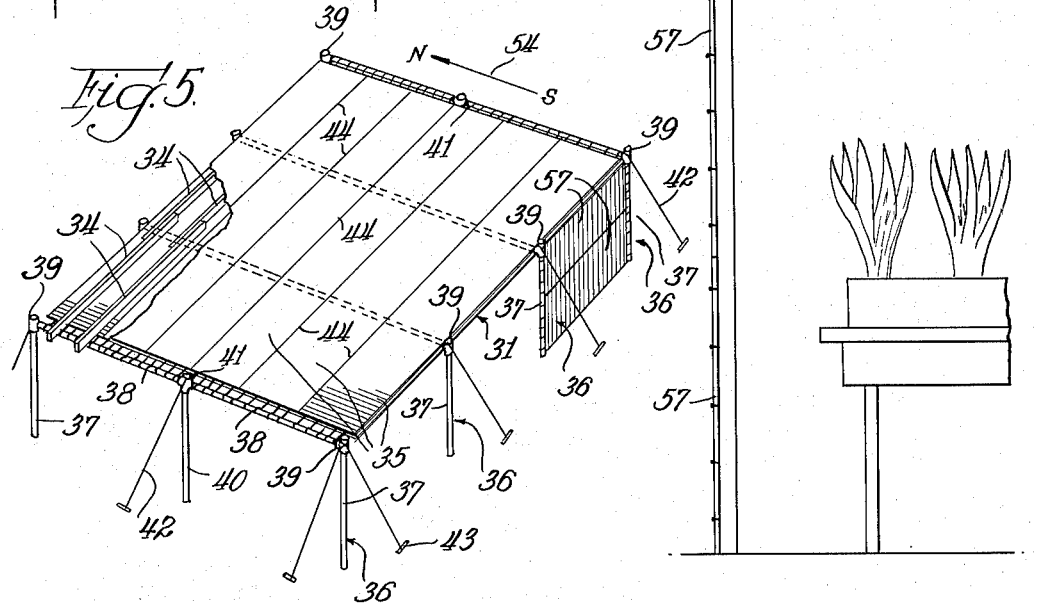
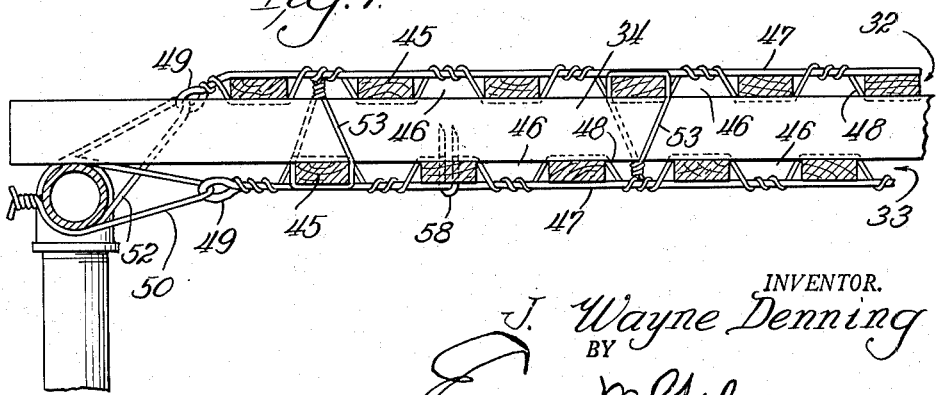
INVENTOR.
J. Wayne Denning
BY
Eugene M. Giles
Atty.

United States Patent Office 2,741,874
Patented Apr. 17, 1956

2,741,874

SLATTED SHELTER

J. Wayne Denning, Joliet, Ill.

Application May 16, 1952, Serial No. 288,217

8 Claims. (Cl. 47—28)

My invention relates to shelters or the like which are adapted particularly for sun shade purposes, and has reference more particularly to shelters which have a slatted overhead covering made of lengths of prefabricated slatted material composed of a series of slats secured together in laterally spaced parallel relation by laterally spaced pairs of wires, which extend lengthwise of the material and are twisted together at the spaces between the successive slats.

These shelters may be employed for various purposes, as for example, for sheltering cattle or the like, in which event, single layers of the slatted material are preferably employed and stretched in adjoining edge to edge relation on a supporting frame at a suitable elevation to accommodate the cattle thereunder. In such shelters the slats are arranged quite close together to exclude most of the sunlight but are spaced apart sufficiently to permit free air circulation through the slatted material.

Another example of the shelter use is for nursery shading, in which event it is preferred to make the overhead covering with upper and lower layers of the slatted material spaced apart vertically by interposed strips and having the slats of each layer arranged in staggered relation to the slats of the other layer so that the slats of each layer are directly opposite the spaces between the slats of the other layer.

In such nursery use, the slats are farther apart than in the cattle shelter example and are arranged to extend north and south, this arrangement being particularly advantageous as the wider spacing and staggered relation of the slats of the two layers permits slanting sun rays to pass through the overhead covering during the morning and afternoon when the sun rays are particularly beneficial for plant growth, but excludes all or substantially all of the sun rays at midday when it is likely to be harmful to nursery plants. In this nursery shelter, as well as in the cattle shelter, the slatted construction allows ample circulation of air through the shelter covering to prevent stagnation of heated air thereunder.

The principal objects of my invention are to provide simple, convenient and inexpensive shelters of the character above mentioned; to permit such shelters to be readily assembled and dismantled; to assure the appropriate amount of shade for the particular purpose for which the shelter is to be used; to provide sufficient air circulation through the shade material to dissipate heated air thereunder; and to insure a strong durable shelter construction which will safely withstand severe wind storms and other weather conditions—these and other objects being accomplished as pointed out hereinafter and as shown in the accompanying drawings, in which:

Fig. 1 is a perspective view of a shelter constructed in accordance with my invention and of a type suitable for cattle shade purposes;

Fig. 2 is a top view of a portion of a length of the slatted material employed for covering the shelter of Fig. 1;

Fig. 3 is an enlarged fragmentary sectional view of the slatted covering of Fig. 1 taken on the line 3—3, and shows end fastenings which may be employed therefor;

Fig. 4 is a detail view of a fastener, which may be employed for anchoring the slatted material to supports at intervals between the ends;

Fig. 5 is a perspective view of a shelter for nursery use, having parts broken away to disclose details of the shelter construction;

Fig. 6 is an enlarged top view of a fragmentary portion of the shelter top of Fig. 5 with portions thereof broken away to disclose details of the construction;

Fig. 7 is an enlarged sectional view taken on the line 7—7 of Fig. 6; and

Fig. 8 is a view, also somewhat enlarged taken on the line 8—8 of Fig. 6.

Referring now to the structure shown in Figs. 1, 2, 3 and 4 and which is illustrative of a type of shelter which may be made in accordance with my invention for cattle shade purposes and the like, the shelter comprises a slatted covering, which is indicated as a whole at 10, and is composed of a number of lengths or strips 11 of the slatted material stretched on supporting facilities by which the slatted material is mounted at the proper elevation for the particular shelter purpose.

These lengths or strips 11 are arranged edge to edge, as indicated at 12, on the supporting facilities, the number of strips employed and the length thereof depending upon the area of coverage desired for the shelter, three such lengths 11 being shown in the illustrated shelter.

For supporting the slatted covering 10 at the desired elevation any suitable facilities may be employed, it being important however that supporting facilities be provided which will permit stretching each strip 11 of the slatted material lengthwise and that these strips, if long, be supported at suitable intervals between the ends so that the slatted material is maintained at all times substantially flat and without any appreciable sagging.

I prefer, however, to employ for the cattle shelter, supporting facilities comprising posts 13 having the lower ends thereof embedded in concrete footings 14 which extend into the ground a sufficient distance to maintain the posts securely in upright position, these posts 13 being spaced apart a suitable distance, for example approximately twelve feet, and arranged in line lengthwise of the shelter, and midway of the width thereof. Each end post 13 is preferably braced at the inner side to withstand the stretching tension of the slatted covering, by a slanting post 15 which is secured at its upper end to the respective end post 13 near the upper end of the latter and has the lower end embedded in a concrete footing 16 at a substantial distance from the respective end post as shown.

Each post 13 has a long cross arm 17 secured midway of its length to the upper end of the post 13, each cross arm being of a length to extend across the entire width of the slatted covering 10, and these cross arms 17 are arranged substantially parallel to one another and each is braced to its respective post 13 by a pair of braces 18 located at opposite sides of the respective post 13.

Each length or strip 11 of the slatted material constituting the shelter covering 10 is composed of a series of slats 19 which are interposed at spaced intervals throughout their length, between pairs of wires which extend from end to end of the strip 11 and are twisted together between successive slats as indicated at 20 in Figs. 3 and 4 to secure the slats between the pairs of wires in spaced apart parallel relation with spaces 21 therebetween. The spaced apart pairs of wires are indicated at 22 and the wires of each pair are indicated respectively at 23 and 24.

It is an important feature of this cattle shade structure that the wires which are at one side of the slats 19 are straight and of relatively heavy gauge, these wires being indicated at 23 and referred to hereinafter as the load wires, and that the wires 24 at the other side of the slats and hereinafter referred to as the tie wires are of relatively light gauge, and that the slats 19 are secured between the wires 23 and 24 by bending the tie wire 24 inwardly into and through the spaces 21 between the slats and twisting it around the load wire 23 as shown in Fig. 3 so that only the tie wire 24 is bent and twisted and the load wire 24 is not bent or twisted but remains straight.

Preferably the slats 19 of this cattle shelter are wood strips ½ inch thick and 1½ inches wide and 48 inches long and spaced ¾ of an inch, and the load wire 23 is No. 8 galvanized high-tensile steel wire and the wire 24 is a readily bendable wire of No. 14 gauge.

The lengths 11 of slatted material constituting the shelter covering 10 are preferably arranged with the load wires 23 thereof on the underside, as shown in Figs. 3 and 4, and are laid on top of the cross arms 17 of the intermediate posts 13 as indicated in Fig. 4 and the load wires 23 are connected at their opposite ends to and stretched tautly between the cross arms 17 of the end posts 13. For securing the lengths 11 of slatted material to the end cross arms 17, the load wires 23 thereof are preferably formed at the opposite ends with end loops 25 formed by bending the wire back and twisting it upon itself as shown in Fig. 3 and these looped ends 25 may be connected with the end cross arms 17 in any convenient manner which will insure taut stretching of the load wires 23 between the end cross arms 17.

This may be accomplished by stretching the load wires tautly and fastening the ends thereof to the end cross arms 17 by wires 26 engaged through the end loops 25 and around the cross arms 17 and having their ends twisted together as shown at the right hand end of Fig. 3, or the load wire end loops 25 may be engaged on hooks 27 which have threaded stems 28 which extend through the end cross arms 17 and have nuts 29 thereon at the outer side of the cross arm, as shown at the left hand end of Fig. 3, so that the hook fasteners may be adjusted to impose the required tension on the load wires 23.

Obviously such hook fasteners may be employed at both ends of the strips or lengths 11, or one end of the strip or length may be fastened by wires 26 and the other end thereof may be fastened by hook fasteners 27, 28.

It is also desirable to fasten the lengths 11 of slatted material to the intermediate cross arms 17 and for this purpose tie wires 30 are preferably employed which are passed around the underlying cross arm 17 and a slat 19 directly thereabove and have the ends twisted together as shown in Fig. 4.

The above described shelter may be easily constructed, and dismantled if desired, and is especially strong and durable because of the tautly stretched straight heavy gauge load wires 23 which provide secure and dependable fastening of the slatted material to the end cross arms and also serve as guy wires to brace the cross arms to one another. Because of these straight heavy gauge load wires and the stretched manner in which they are supported, the shelter covering will not stretch or sag and it will not whip in the most severe wind storm.

Moreover the slatted covering not only affords ample protection against the sun but permits sufficient air circulation therethrough to prevent stagnation of heated air thereunder.

Referring now to the shelter shown in Figs. 5, 6, 7 and 8, which is particularly adapted for nursery shading purposes, this shelter comprises supporting facilities having an overhead covering, which is indicated as a whole at 31 mounted thereon, at the required elevation for the nursery shelter purpose, and composed of upper and lower layers 32 and 33 of slatted material arranged in parallel relation and spaced apart a selected distance by intervening strips or stringers 34. Each layer 32 and 33 is composed of strips or lengths 35 of slatted material which are stretched tautly across the top of supporting facilities and secured thereto at their ends.

The supporting facilities for the slatted covering may be of any desired type which will permit stretching of the strips or lengths 35 of the covering 31 tautly thereon and will leave the space under the covering free to accommodate the nursery plants thereunder and provide working space around the plants for free access thereto.

Such facilities may be conveniently made, as shown herein, of lengths of pipe, threaded and connected together by conventional pipe fittings to form frames which are set upright in spaced apart relation and have cross pipes at the top arranged in spaced apart substantially parallel relation to support the covering 31 thereon. Four such frames are shown in the illustrative structure of Fig. 5, each of which is indicated as a whole by the reference numeral 36, although it is to be understood that the number thereof will depend upon the size of the nursery shelter and the length of the strips 35 to be mounted thereon.

These pipe frames are preferably spaced apart a distance of approximately twelve feet, and each is composed of a pair of upright end pipes 37 which have their lower ends firmly embedded in the ground and have an overhead pipe 38 extending between and connected to the upper ends thereof preferably by pipes T's 39 which have the cross pipe 38 screwed into the side branch thereof and the upright pipe 37 screwed into an end branch thereof so the other end branch of the T projects upwardly above the intersection of the pipes for a purpose hereinafter explained.

The overhead pipes 38 are preferably supported at intervals of about 12 feet and generally are of such length to require at least one intermediate support, as indicated at 40 in Fig. 5, which like the uprights 37 is a pipe which has its lower end firmly embedded in the ground and has its upper end connected to the cross pipe 38 by a pipe fitting 41. Preferably the fitting 41 of the two end frames 37 are pipe X's which have four branches, and the cross pipe 38 is composed of two sections which are threaded into two opposed branches respectively and the pipe 40 is threaded into another branch so that the other branch projects upwardly above the intersection of the pipes. The fittings 41 of the intermediate frames 36 are preferably pipe T's with three branches and have the pipe 40 screwed into the side branch and the cross pipe 38 composed of two sections which are screwed into the two end branches so that there is no branch extending above the intersection of the pipes.

These frames 36 are preferably braced to the ground by guy wires 42 which extend outwardly from the shelter at each corner post 37 and at each intermediate post 40 of each end frame 36, these guy wires being sloped outwardly and downwardly from the respective posts and having their lower ends anchored firmly to the ground by guy wire stakes 43 of substantial length, or in any other convenient manner, and at a sufficient distance from the respective post to securely brace the post.

Each of the corner posts 37 is provided with two guy wires 42, one extending outwardly from the corner post in the direction of the length of the shelter and the other extending outwardly in the direction of the width of the shelter, as shown in Fig. 5, and the upper ends of all these guy wires 42 are secured to the upwardly projecting branch, hereinbefore mentioned, of the pipe T or pipe X at the upper end of the respective post 37 or 40 to which the respective guy wire is connected.

Each layer 32 and 33 of the covering 31 is composed of six lengths 35 of slatted material laid edge to edge, as indicated at 44, on the cross pipes 38 of the intermediate frames 36 and secured at their ends to the cross pipes 38 of the two end frames 36.

These lengths or strips 35 are of exactly the same construction as the slatted material shown in Fig. 2 which is employed for the covering 10 of the shelter of Fig. 1 except that in the lengths or strips 35 the slats 45 thereof are preferably 2 inches wide and the spaces 46 between the slats are 2 inches wide, it being particularly important for reasons hereinafter explained that in the nursery shelter covering the spaces between the slats be at least as wide as the slats.

Accordingly it is to be understood that the lengths 35 of slatted material of the upper and lower layers 32 and 33 of the covering 31 have straight heavy load wires 47 of No. 8 galvanized high-tensile steel at one side of the slats 45 and relatively light readily bendable tie wires 48 of No. 14 gauge at the other side of the slats 44 and that the latter wires are bent inwardly into and through the spaces 46 between the slats 45 and twisted around the straight load wires 47 to secure the slats 45 to the load wires 47. Moreover the load wires 47 are bent back and twisted upon themselves at the opposite ends to form attaching loops 49.

The strips or lengths 35 of the lower layer 33 of the covering 31 have the load wires 47 thereof on the underside and these strips are laid over the cross pipes 38 of the intermediate pipe supports 36, as shown in Fig. 8, and have their opposite ends secured to the cross pipes 38 of the two end pipe supports 36 so that the strips or lengths 35 are tautly stretched between the latter cross pipes 38.

For securing the ends of the strips 35 to the cross pipes 38 wires 50 are engaged through the end loops 49 of the strips 35 of the lower layer 33 and around the respective cross pipe 38 and have these ends twisted together as shown in Fig. 7.

For spacing the layers 32 and 33 two spaced apart strips or stringers 34 are laid on top of each strip 35 of the lower layer 33 and extend from end to end thereof, as indicated in Fig. 6, and project outwardly over the cross pipes 38 of each end frame 36 as indicated in Figs. 6 and 7. These strips 34 are 1 inch by 2 inch strips of wood laid edgewise on the lower layer 33 so as to hold the upper layer 32 two inches above the lower layer 33, and these strips may be composed of sections which overlap one another over the cross pipes 38 of the intermediate frames 36 as indicated at 51 in Fig. 6.

The strips or lengths 35 of the upper layer 32 preferably have the load wires 47 thereof on the upper side and these strips 35 are laid on the strips or stringers 34 and have their opposite ends secured to the cross pipes 38 of the two end supports so that the strips or lengths 35 are tautly stretched between the latter cross pipes. Fastening wires 52, similar to the fastening wires 50 are engaged through the end loops 49 of the upper strips 35 and around the respective cross pipe 38 and have their ends twisted together.

It is important in this nursery covering 31 that the slats 45 of each layer 32 and 33 be staggered with respect to the slats 45 of the other layer so that the slats of each layer are directly opposite the spaces 46 between the slats 45 of the other layer as shown in Figs. 7 and 8 and accordingly the lengths or strips 35 of the upper layer 32 must be stretched and secured in place with the slats 45 thereof directly opposite the spaces 45 of the lower layer 33 throughout the entire area of the covering 31.

In order to hold the layers 32 and 33 in place when thus installed the slats 45 of each layer 32 and 33 may have wires 53 engaged therearound, at various places throughout the area of the covering 31, and engaged around the strips or stringers 34 with their ends twisted together to hold the layers 32 and 33 securely in place against the strips or stringers 34. If preferred, staples may be employed instead of the tie wires 53 and driven through the slats 45 of the layers 32 and 33 and into the strips or stringers 34 as indicated at 58 in Fig. 7.

The layers 32 and 33 are spaced apart and the slats 45 each arranged in staggered relation to the slats 45 of the other layer for the particular purpose of obstructing and intercepting rays of noonday sun and permitting passage of sun rays through the covering 31 during the morning and afternoon, and it is especially important for this purpose that the nursery shelter of Figs. 5, 6, 7 and 8 be constructed so that the slats 45 and spaces 46 therebetween extend north and south as indicated by the directional arrow 54 in Fig. 5. Inasmuch as the slats 45 and spaces 46 extend in the same direction as the cross pipes 38 the pipe frames 36 are installed in a position so that the cross pipes 38 thereof extend north and south.

When so installed with the covering 31 mounted thereon as above explained, the slats 45 and spaces 46 extend north and south, and in view of the staggered arrangement of the slats with the slats 45 of each layer directly opposite the spaces 46 of the other layer and the construction of the slatted material so that the spaces 46 are the same as or not appreciably greater than the width of the slats 45, all or substantially all of the sun rays are intercepted by the covering 38 during the noon day period when the run rays are most intense and are likely to be injurious to the growing nursery plants thereunder.

Most growing plants need sunlight for healthy growth, however, and the above described construction of the nursery shelter of Figs. 5, 6, 7 and 8 is particularly advantageous for the reason that although it excludes all or substantially all the sun rays at noonday, as aforesaid, it nevertheless permits sun rays to pass through the covering 31 during the morning and afternoon, when the sun rays are less intense and more favorable for healthy plant growth, the spacing of the layers 32 and 33 and staggered arrangement of the slats 45 thereof permitting the slanting rays of sun, in the morning and afternoon, to pass through the covering 31 as indicated by the broken lines 55 and 56 in Fig. 8. Moreover the arrangement of the covering layers 32 and 33 permit free circulation of air therethrough and prevent stagnation of heated air under the covering.

This nursery shelter is especially strong and sturdy when constructed as explained herein, is easily constructed at minimum expense and may be readily disassembled and set up elsewhere, which is generally quite desirable with such shelters.

In the foregoing description of the illustrated shelters it is indicated that the strips or lengths of slatted material composing the shelter covering are arranged on the supporting framework in edge to edge relation. It is to be understood however that such edge to edge relation does not preclude some overlapping as the edge portion of one strip may overlap the edge portion of the adjoining strip to some extent in utilizing the invention hereof.

It is contemplated also that the nursery shelter may be enclosed or partially enclosed around the sides if desired by strips of slatted material extending horizontally between and secured to the marginal posts 37 and 40, two such strips, one superposed above the other, being indicated at 57 in Figs. 5 and 8.

While I have shown and described my invention in preferred forms, I am aware that various changes and modifications may be made therein without departing from the principles of the invention, the scope of which is to be determined by the appended claims.

What I claim is:

1. A shelter of the class described having an overhead covering comprising a plurality of adjoining substantially parallel strips of slatted material, each of which is a separate complete unit, and a pair of elevated supports between which said strips are stretched lengthwise and to which the opposite ends of the strips are secured, each said strip comprising a plurality of laterally spaced substantially parallel straight stiff wires of relatively heavy gauge by which the strip is secured to said supports, said straight stiff wires being secured at their opposite ends to and stretched tautly between said supports, a series of flat slats which extend crosswise of said straight stiff wires and are arranged consecutively thereon in laterally spaced substantially parallel relation between said supports, said straight stiff wires being at one side of the series of slats and having the slats individually clamped sidewise thereagainst and each said straight stiff wire having a companion wire of relatively light gauge extending therealong at the opposite side of the series of slats and each said light gauge wire being bent through the spaces between the slats and there wound around its companion straight stiff wire at the opposite side of the series of slats and individually clamping each of said slats sidewise against its said companion straight stiff wire.

2. A shelter of the class described comprising a pair of spaced apart elevated end supports and an overhead covering composed of strips of slatted material which are arranged edge to edge in substantially parallel relation and stretched endwise between said elevated supports, each of said strips being a separate complete unit comprising a series of slats which are arranged consecutively in laterally spaced substantially parallel relation between said supports and secured between laterally spaced pairs of wires, each pair of which said wires extends lengthwise of the strip and comprises a straight stiff wire of relatively heavy gauge which extends straight along one side of the series of slats and has the slats individually clamped sidewise thereagainst and is secured at its opposite ends to and stretched tautly between the said end supports each said strip being individually secured by said straight stiff wires thereof to said elevated supports and another wire of relatively light gauge which extends along the other side of the series of slats and is bent through the spaces between the slats and there wound around the straight stiff heavy gauge wire at the opposite side of the series of slats and individually clamping each of said slats sidewise against the straight stiff heavy gauge wire, and other elevated supports interposed between and spaced from said end supports and having said strips extending thereover and supported thereon.

3. A shelter of the class described comprising a pair of spaced apart elevated supports and an overhead covering composed of strips of slatted material which are arranged edge to edge in substantially parallel relation and srtetched endwise between said elevated supports, each of said strips comprising a series of slats which are arranged consecutively in laterally spaced substantially parallel relation between said supports and secured between laterally spaced pairs of wires, each pair of which said wires extends lengthwise of the strip and comprises one wire of relatively heavy gauge which extends straight along one side of the series of slats and is secured at its opposite ends to and stretched tautly between the supports and another wire of relatively light gauge which extends along the other side of the series of slats and is bent through the spaces between the slats and there wound around the straight heavy gauge wire at the opposite side of the series of slats to secure the slats onto the straight heavy gauge wire, said straight wires of relatively heavy gauge having fastening means at the opposite ends thereof by which they are secured to said supports and the said fastening means at one end of each strip of slatted material including threaded adjusting means by which the heavy gauge wires thereof are individually stretched between the supports.

4. A shelter of the class described having elevated end supports and an overhead covering composed of two vertically spaced substantially parallel layers of slatted material extending between said elevated end supports, each of which layers is composed of prefabricated srtips of slatted material which are stretched endwise and arranged edge to edge in substantially parallel relation and each of which said strips is a separate complete unit composed of a series of laterally spaced substantially parallel slats interposed between laterally spaced pairs of wires which extend from end to end of the strip and wherein one wire of each pair is a relatively heavy straight stiff wire at one side of the series of slats and is stretched between and secured at its opposite ends to said elevated end supports and wherein the other wire of each pair is at the other side of the series of slats and is a relatively light wire and is bent into and through the spaces between the slats and there wound around the straight stiff wire of said pair and individually clamps each of said slats sidewise against the straight stiff wire of said pair, the slats of each layer being arranged in staggered relation to the slats of the other layer with the slats of each layer parallel with and opposite the spaces between the slats of the other layer.

5. A shelter of the class described having elevated end supports and an overhead covering composed of two vertically spaced substantially parallel layers of slatted material extending between said elevated end supports, each of which layers is composed of prefabricated strips of slatted material which are stretched endwise and arranged edge to edge in substantially parallel relation and each of which said strips is a separate complete unit composed of a series of laterally spaced substantially parallel slats interposed between laterally spaced pairs of wires which extend form end to end of the strip and wherein one wire of each pair is a relatively heavy straight stiff wire at one side of the series of slats and is stretched between and secured at its opposite ends to said elevated end supports and wherein the other wire of each pair is at the other side of the series of slats and is a relatively light wire and is bent into and through the spaces betwen the slats and there wound around the straight stiff wire of said pair and individually clamps each of said slats sidewise against the straight stiff wire of said pair, the slats of each layer being arranged in staggered relation to the slats of the other layer with the slats of each layer parallel with and opposite the spaces between the slats of the other layer, said layers having spacing strips interposed therebetween to which said layers are secured.

6. A shelter structure of the class described comprising a plurality of upright posts arranged in line in laterally spaced apart relation and each having at the upper end thereof a long cross arm which extends across and is secured substantially midway between its ends to the top of the post, and a plurality of strips of slatted material mounted on said cross arms and stretched tautly between and having the opposite ends thereof secured to the cross arms of the end posts of said plurality of upright laterally spaced posts, each of said strips comprising a series of slats which are arranged consecutively in laterally spaced apart parallel relation between said last mentioned cross arms and secured between laterally spaced pairs of wires which extend lengthwise of the strip from end to end thereof and wherein one wire of each pair is a straight stiff wire of relatively heavy gauge which extends straight along one side of the series of slats and is secured at its opposite ends to and stretched tautly between said last mentioned cross arms and the other wire of that pair is readily bendable wire of relatively light gauge which extends along the other side of the series of slats and is bent inwardly through the spaces between the slats and is there twisted around the straight relatively heavy wire of that pair at the first mentioned side of the series of slats, each of said strips being a separate complete unit and individually secured by the aforesaid straight stiff wires thereof to the cross arms of the end posts.

7. A shelter structure of the class described comprising a plurality of separate upright laterally spaced frames each of which comprises a pair of end posts having an elongated cross member extending between and secured at its opposite ends to the upper ends of the end posts thereof and the said elongated cross members of said frames arranged in spaced apart parallel relation, a plurality of strips of slatted material mounted on said cross members and stretched tautly between and having the opposite ends thereof secured to the cross members of the end frames of said plurality of upright laterally spaced frames, each of said strips comprising a series of slats which are arranged consecutively in laterally spaced apart parallel relation between said last mentioned cross members and secured between laterally spaced pairs of wires which extend lengthwise of the strip from end to end thereof and wherein one wire of each pair is a straight stiff wire of relatively heavy gauge which extends straight along one side of the series of slats and is secured at its opposite ends to and stretched tautly between said last mentioned cross members and the other wire of the pair is a readily bendable wire of relatively light gauge which extends along the other side of the series of slats and is bent inwardly through the spaces between the slats and is there twisted around the straight relatively heavy wire of that pair at the first mentioned side of the series of slats, and guy wires extending outwardly from said end frames and anchored at their outer ends and positioned to counteract the pulling strain of the aforesaid tautly stretched relatively heavy wires on the cross members of said end frames, each of said strips being a separate complete unit and individually secured by the aforesaid straight stiff wires thereof to the cross members of the end frames.

8. A shelter of the class described having an overhead covering comprising a plurality of adjoining substantially parallel strips of slatted material, each of which is a separate complete unit, and a pair of elevated supports between which said strips are stretched lengthwise and to which the opposite ends of the strips are secured, each said strip comprising a plurality of laterally spaced substantially parallel straight stiff wires of relatively heavy gauge by which the strip is secured to said supports, said straight stiff wires being secured at their opposite ends to and stretched tautly between said supports, a series of flat slats which extend crosswise of said straight stiff wires and are arranged consecutively thereon in laterally spaced substantially parallel relation between said supports, said straight stiff wires being at one side of the series of slats and having the slats individually clamped sidewise thereagainst and each said straight stiff wire having a companion wire of relatively light gauge extending therealong at the opposite side of the series of slats and each said light gauge wire being bent through the spaces between the slats and there wound around its companion straight stiff wire at the opposite side of the series of slats and individually clamping each of said slats sidewise against its said companion straight stiff wire, the said straight stiff wires of each said strip being provided with loops at the opposite ends thereof by which said wires are secured at their opposite ends to said elevated supports and the said loops at at least one end of each strip having connecting means which extend therefrom to one of said elevated supports and by which the loops are securable to said support at selected distances therefrom.

References Cited in the file of this patent

UNITED STATES PATENTS

| 514,610 | Wright | Feb. 13, 1894 |
| 796,461 | Shimer | Aug. 8, 1905 |
| 860,756 | Matheus | July 23, 1907 |
| 905,674 | Elliott | Dec. 1, 1908 |

FOREIGN PATENTS

| 327,657 | France | Apr. 3, 1903 |
| 456,176 | France | June 12, 1913 |
| 590,442 | France | Mar. 18, 1925 |
| 93,464 | Germany | Aug. 12, 1897 |
| 206,665 | Germany | Feb. 10, 1909 |